United States Patent [19]

Tilman

[11] 4,292,926
[45] Oct. 6, 1981

[54] METHOD FOR THE AUTOMATIC FINISH MILKING DURING A MECHANICAL MILK REMOVAL PROCEDURE

[75] Inventor: Hoefelmayr Tilman, Niederteufen, Switzerland

[73] Assignee: Bio-Melktechnik Swiss Hoefelmayr & Co., Niederteufen, Switzerland

[21] Appl. No.: 82,202

[22] Filed: Oct. 5, 1979

[30] Foreign Application Priority Data

Oct. 12, 1978 [DE] Fed. Rep. of Germany ....... 2844562

[51] Int. Cl.³ ................................................ A01J 5/04
[52] U.S. Cl. .............................. 119/14.02; 119/14.08; 119/14.14
[58] Field of Search ............... 119/14.08, 14.02, 14.14, 119/14.41

[56] References Cited

U.S. PATENT DOCUMENTS

| | | | |
|---|---|---|---|
| 3,754,532 | 8/1973 | Troberg et al. | 119/14.08 |
| 3,783,837 | 1/1974 | Olander | 119/14.08 |
| 4,011,838 | 3/1977 | Nordegren et al. | 119/14.08 |
| 4,064,838 | 12/1977 | Mukarovsky et al. | 119/14.08 |
| 4,211,184 | 7/1980 | Abrahamson | 119/14.02 |

*Primary Examiner*—Hugh R. Chamblee
*Attorney, Agent, or Firm*—Blanchard, Flynn, Thiel, Boutell & Tanis

[57] ABSTRACT

The invention relates to a method for the automatic finish milking during a mechanical milk removal procedure, in which the teat which is introduced into an elastic teat rubber of the milking cup is exposed to a predetermined underpressure, a pulsating underpressure is applied to a space between a milking cup housing and teat rubber which encloses the teat, a continuous milk flow measurement is carried out and the milking intensity is reduced dependent on the result of measurement.

7 Claims, 5 Drawing Figures

METHOD FOR THE AUTOMATIC FINISH MILKING DURING A MECHANICAL MILK REMOVAL PROCEDURE

FIELD OF THE INVENTION

This invention relates to a mechanical milking procedure and, more particularly, to a procedure wherein a continuous milk flow measurement is performed and the milking intensity is controlled in relationship to the result of the measurement.

BACKGROUND OF THE INVENTION

For an economical production of milk, the complete emptying of the udder is of greatest importance. We thereby do not only deal with the milk and fat amounts which are obtained directly during each milking. The degree of emptying of the udder influences also the course of the lactation curve, thus the stamina of the cow and the milk output in the next following lactation sections. Furthermore, poorly emptied udders are increasingly subject to udder diseases.

A condition for an as high as possible degree of udder emptying is, aside from a full stimulation of the milk ejection process of the cow and a gentle and quick milk removal procedure, an as much as possible complete recovery of the available residual milk at the end of the milking process.

The residual milk phenomenon is explained by the anatomic structure of the udder. Between the large milk storage chamber of the udder (gland cistern) and the smaller storage chamber of the individual teat (teat cistern) there is provided at the level of the teat base an inner annular fold (Fuerstenberg'sche Venenring). At the lower end of the teat cistern is the streak canal which is closed in the normal condition, which canal forms the port of the teat to the outside. During milking, the annular fold between the gland and teat cisterns is open wide during the highest milk flow rate. The length and the radial expandibility of the streak canal determines the milk resistance (flow resistance) on the udder. This means that the milking vacuum is not continued into the teat cistern. The inner pressure in the teat of a cow ready to be milked lies between approximately 30 to 60 mbar. above the atmospheric pressure, so that the teat under the action of the milking vacuum rests fully on the teat rubber which supports said teat.

With an increase in udder emptiness, the pressure on the inside of the udder slowly decreases and the annular fold slowly narrows down. Starting from a certain point in time, less milk can flow through the annular fold into the teat cistern, than is sucked out through the streak canal. As a result, not only does the milk flow diminish, but at the same time the milking vacuum moves now into the teat cistern. This causes the earlier full teat to relax and the teat cistern is now compressed during each relief cycle, which causes the inner mucous membranes of the cistern lining to be rubbed against one another. This causes pain to the cow, which leads to a further blockage of the cow's milk yield. If the mechanical milking operation is continued beyond this point in time, then this may lead to injury to the structure of the udder. At the time, when the milking vacuum penetrates into the teat cistern and the milk flow stops, milk will, however, still flow into the gland cistern, which is no longer automatically mechanically milked. Therefore, following the mechanical milking process, a time-consuming procedure is required to obtain a finish milking. This finish milking stage takes up a considerable portion of the routine time of a milking person, which he or she must spend per cow.

In order to achieve an as much as possible gentle mechanical milking action and in order to permit an automatic finish milking, German Pat. No. 25 39 868 already discloses a method, in which first at the start of the milking operation and during approximately two minutes independent of the milk flow rate, a high milking underpressure is applied and in which after this time is over, the milking underpressure is controlled such that, when falling below a milk flow rate of approximately 0.5 l/min., the milking underpressure is switched over to a lower finish milking underpressure. A similar method has already become known from German Pat. No. 19 56 196, in which simultaneously with the switching over from a milking underpressure to a lower finish milking underpressure, when falling below a predetermined milk flow value, the same reduced finish milking underpressure is transmitted also into the space between the suction insert and the milking cup housing as a pulsation underpressure. Also this reference already describes a method in which, dependent on the falling below of a predetermined milk flow value, the relationship between the durations of the pressure and suction periods of the pulsation underpressure is changed such that during a large milk flow interval, the suction period is long and during a small or no milk flow period, the suction period is short. Also this reference discloses a method in which during the finish milking stage, the pulsation frequency is considerably reduced with respect to the milking stage. Also German OS No. 25 24 398 already discloses a method, in which for the gentle treatment of the teat during the finish milking stage, the pressure inside of the suction insert is held at the normal underpressure, however, the underpressure applied during the pulsation is reduced so that the walls of the suction insert rest on the teat so that only the tip of the teat and not the entire teat is exposed to the underpressure inside of the suction insert.

From German OS No. 24 14 107 furthermore a method is already known, in which an injury of the teat during the finish milking stage is avoided and an automatic finish milking is achieved by lowering the pulse frequency of the pulsator when falling below a pregiven milk flow rate, without causing the vacuum inside of the suction insert, namely in the milk discharge line, to be changed with respect to the milking underpressure.

From Australian Pat. No. 109 446 an apparatus has also already become known, in which the milking underpressure can be controlled proportionally with respect to the respectively existing milk flow. This means, if at the start of the milking operation no or only a small milk flow exists, a small milking underpressure is applied, which is enlarged to the degree that the milk flow increases. At the end of the milking operation, the milking underpressure is then reduced again at the same degree that the milk flow is reduced. Such a milking method is, however, not suitable for cows which are difficult to milk, since here especially right from the start a high milking underpressure is needed in order to at all achieve an acceptable milk flow. Furthermore the milking method can lead, especially in the case of cows which are difficult to milk, to physiologically unfavorable long milking times, so that the cow which must be milked loses already due to the long milking time the willingness to further give milk even though a substantial amount of milk has not yet been milked off.

Also it has already been tried to apply a constant, however, substantially smaller milking underpressure than is usually common. This, however, leads automatically to physiologically unfavorable long milking times, which reduces the amount of milk given as a whole.

German OS No. 26 46 596 also already discloses an apparatus for the automatic finish milking after falling below a predetermined milk flow rate, in which with the help of a linkage and a cable line, which is swung under the cow and which engages the milking tool, at the start of the finish milking stage a vertical or inclined pull is applied downwardly onto the milking tool.

A similar pneumatically operated arrangement has already become known from German OS No. 1 278 166, in which the entire milking tool is held on a horizontally movable and a vertically movable arm. This arrangement is controlled pneumatically at a reduction of the milk flow rate below a value of 0.4 kg/min. such that through the milking cup a downwardly directed force is applied onto the teat, which is supposed to achieve an intensification of the milk discharge. This downwardly directed pull onto the milking cup is maintained during the entire so-called finish milking stage, until the milk flow rate falls below a value of 0.2 kg/min, after which the entire milking tool is pulled off automatically.

While it is possible with the last mentioned apparatus, with which in the finish milking stage a downwardly directed pull onto the milking tool is applied, a substantially independent finish milking can be achieved, if desired, such an automatic finish milking cannot be carried out successfully by changing the milking parameters. Such devices, however, with which a vertical pull onto the milking tool can be applied during the finish milking stage, have the important disadvantage that they strongly limit the freedom of movement of the milking tool on the cow during the milking process and thus simultaneously interfere with the willingness of the cow to give milk. Furthermore such devices can only be utilized in milking stalls. On the other hand, such a device is technically very expensive and at least in practice very susceptible to trouble. Furthermore, a considerable risk of injury to the cows exists through the use of such devices.

According to the present invention. I have discovered that the possibility of the automatic finish milking depends decisively from the position the teat rubber of the milking cup is at during the finish milking stage.

As was already discussed above, a cow which is ready to be milked has a teat innerpressure of approximately 30 to 60 mbar. above the atmospheric pressure so that the teat under the action of the milking underpressure rests fully on the teat rubber which supports it. Thus a strong friction exists between the teat and the teat rubber, through which, when equilibrium exists between the milking tool weight and the milking underpressure, a climbing up of the milking cup on the teat due to the suction action of the milking underpressure is prevented. However, starting from a certain point in time, as soon as less milk flows into the teat cistern, due to a slow narrowing down of the annular fold, than is sucked out through the streak canal due to the milking underpressure, the milking underpressure moves on into the teat cistern. As a result, the underpressure in the teat cistern rises until the pressure difference between the underpressure in the teat cistern and the milking underpressure is reduced so low, that based on this small pressure difference the streak canal is no longer being opened. The pressure difference, at which the streak canal opens up, varies between 0.15 and 0.5 bar. In the medium value the pressure difference lies between 0.20 and 0.25 bar, whereby cows, which need a pressure difference of 0.25 bar before a milk discharge occurs, are already identified as cows which are difficult to milk. As soon as the underpressure moves on into the teat cistern, the earlier full teat relaxes within approximately 3 to 10 pulsation cycles. This reduces the friction between the teat rubber and the teat and the milking cup moves upwardly on the teat in direction of the teat base due to the suction action of the milking underpressure, until a new force equilibrium is achieved. The danger of the milking cup climbing up on the teat is thus greater in the case of cows which are difficult to milk. This climbing of the milking cup up on the teat causes the upper enlarged head of the teat rubber to apply an additional pressure on the annular fold at the lower end of the gland cistern and totally contracts the annular fold from outside. This causes the loosening of the muscle tone of the smooth udder muscles of the cow to stop prematurely, since the cow has in this gland area particularly sensitive pressure and contact receptors, which are extremely sensitive to the pressure of the enlarged head of the teat rubber. This results in the cow feeling unwell and closing herself the muscle, which blocks the milk flow. The action of the enlarged head which blocks the milk flow is further enhanced by the milking underpressure moving into the head of the milking cup during a climbing of the milking cup up on the teat, which causes the extremely sensitive teat tissue to be exposed at the base of the teat below the contracting annular enlarged head of the teat rubber to the full milking underpressure, without supporting the teat tissue in this area by the teat rubber. This procedure causes the cow to have an additional pain, which leads to the cow further blocking the milk discharge. Thus the milk which still flows from the milk gland into the gland cistern can no longer be removed. The amount of this loose residual milk amounts on the average to almost 500 g. per milking with a variation range of 0 to 2000 g. This high amount of residual milk today does not permit a finish milking for reasons of the entire production and the health of the udder. In order to be able to withdraw this finish milk, the closing of the annular fold must be reversed. This can be achieved by applying such a high force onto the milking cup or onto the milking tool, that the milking cups are lowered on the teat. However, this operation must take place immediately after the milk flow stops in the teat, in order to avoid an udder damaging blind milking.

As will be discussed more in detail further below, it has been discovered that in the case of milking methods which have been known up to now which effect changes of the milking parameters in the finish milking stage, the milking cups have mostly already climbed up on the teat, before the actual finish milking stage starts. As was discovered, however, a finish milking of the finish milk can no longer be achieved by a change of the milking parameters even if the milking cup has already climbed up on the teat. A manual or mechanical handling of the milking cup is then needed in order to again guide the milking cups downwardly on the teat and to hold them in a lowered position in order to be able to withdraw also the finish milk. A manual lowering of the milking cup by the milker requires, however, much work. A mechanical apparatus for lowering the milking tool is extremely complicated and brings about a considerable risk of injury to the cows.

Therefore, the basic purpose of the present invention is to provide a method for the automatic finish milking during a mechanical milk removing process, in which a premature blocking of the passage between the gland cistern and the teat cistern is prevented prior to the complete emptying of the udder.

This purpose is inventively attained starting out from a method of the above-mentioned type of continuously measuring or detecting the change of the milk flow per unit of time and by initiating a reduction of the milking intensity directly after a reduction of the milk flow rate of more than 1 kg/min$^2$, which reduction is determined during a period of time of 5 to 10 seconds.

This abrupt reduction of the milk flow rate at the end of the main milking stage is in the case of every cow an unerring sign indicating the beginning of the end of the main milking stage. At this point in time, the teat is still full, the passage between gland cistern and teat cistern is not yet blocked, and the milking cup has not yet climbed up on the teat. By directly reducing the milking intensity at this time, a blocking of the passage between gland cistern and teat cistern and the climbing of the milking cup up on the teat, which is effected secondarily through this, can be prevented. As a result of this measure, an unhindered further milk flow up to the total finish milking can be maintained.

A second solution to the aforementioned problem consists in providing a method for the automatic finish milking during a mechanical milk removal process, in which the teat which is introduced into an elastic teat rubber of the milking cup is exposed to a predetermined underpressure and a pulsating underpressure is applied to a space between a milking cup housing and the teat rubber which encloses the teat, the measurement of a milking parameter is carried out continuously and the milking intensity is reduced dependent on the result of the measurement, which is characterized by the continuous measurement being the detecting of the pressure in the inner chamber of the head of the teat rubber below the ring lip which rests against the teat and by effecting a reduction of the milking intensity at the start of a lowering of said pressure.

As a result of this, a further possibility exists for the automatic control of the milking operation. However, this possibility of control is not as exact as the first mentioned control possibility, since a lowering of the pressure in the inner chamber of the head of the teat rubber occurs most of the time not before the teat has already substantially relaxed so that a climbing of the teat rubber up on the teat is eminent.

Through both inventive solutions, it is achieved that a blocking of the passage between the gland cistern and the teat cistern and thus a climbing of the milking cup up on the teat is prevented. As a result, a substantially better automatic mechanical udder emptying is achieved, particularly with substantially lesser finish milking amounts. Through this the finish milking manipulations of the milking person can be limited alone to the so-called control handling. A finish milking by hand is in every case no longer necessary. Particularly preferable is the use of the inventive method in milking systems with automatic milking tool removal, which occurs with a timely delay, when the milk flow has stopped. By using such automatic milking tool removing devices so far, the loose residual milk remained in the udder and this was caused by the system with the consequence of increased mastitis problems and poorer milk outputs of the cows.

BRIEF DESCRIPTION OF THE DRAWINGS

The invention will be discussed more in detail hereinbelow with reference to the drawings, in which.

DETAILED DESCRIPTION

Figure 1:
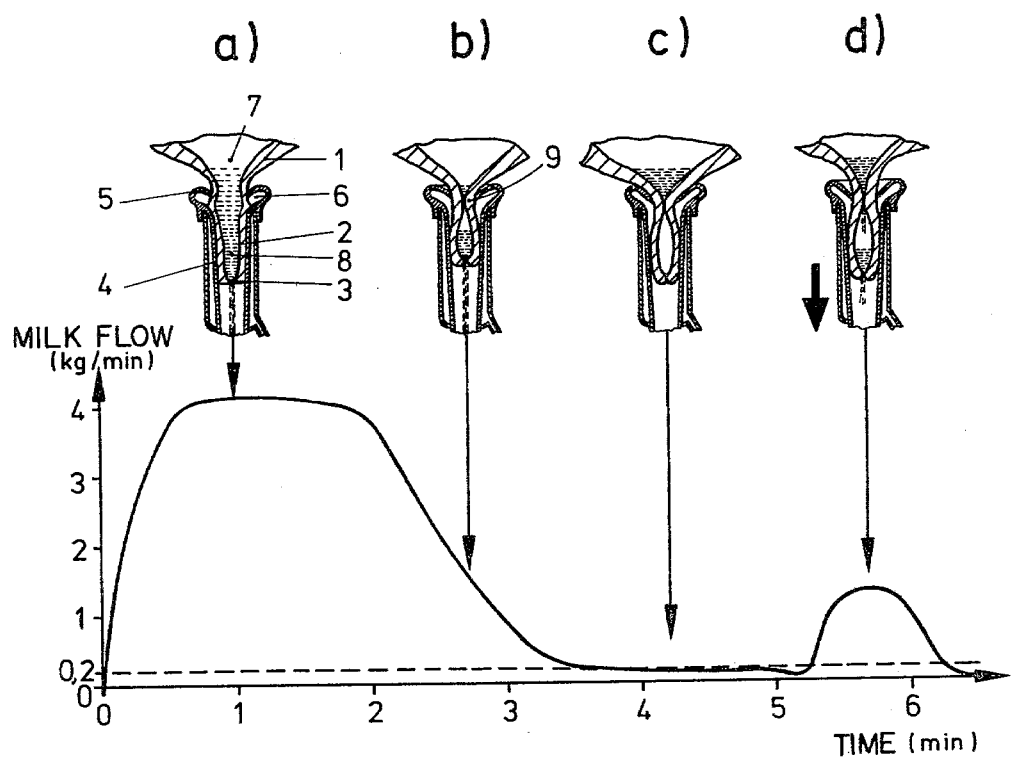
FIG. 1 illustrates schematically the common milk flow pattern during a milking operation with illustrations a-d showing the influence on the teat during the various stages of the mechanical milk removal process.
Figure 2:
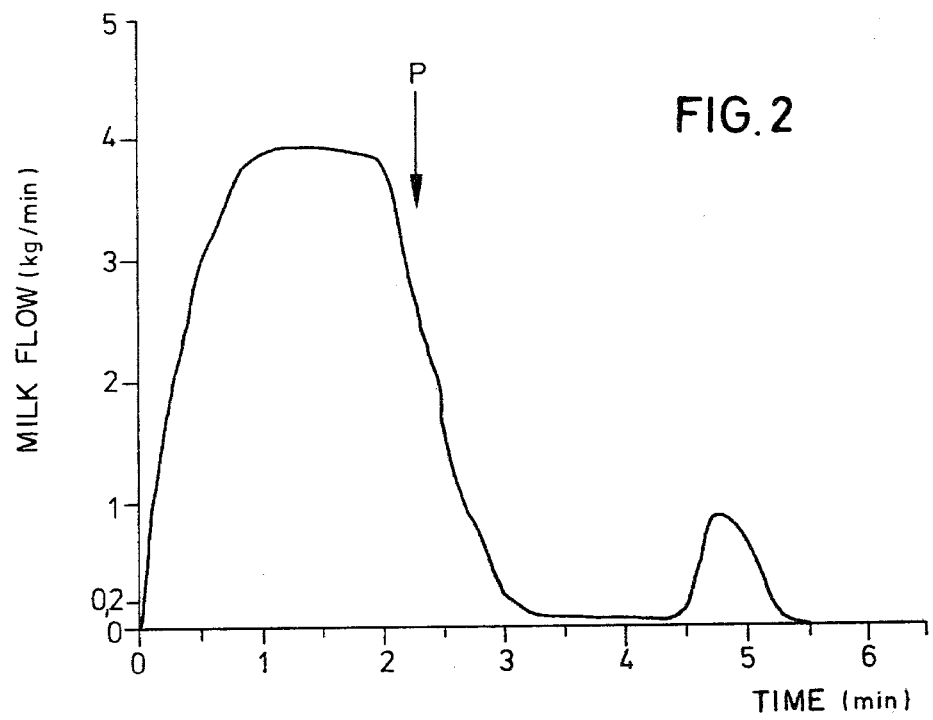
FIGS. 2-5 illustrate the milk flow pattern in relationship to time, as it was measured on various cows, which were in different lactation months.
Figure 3:
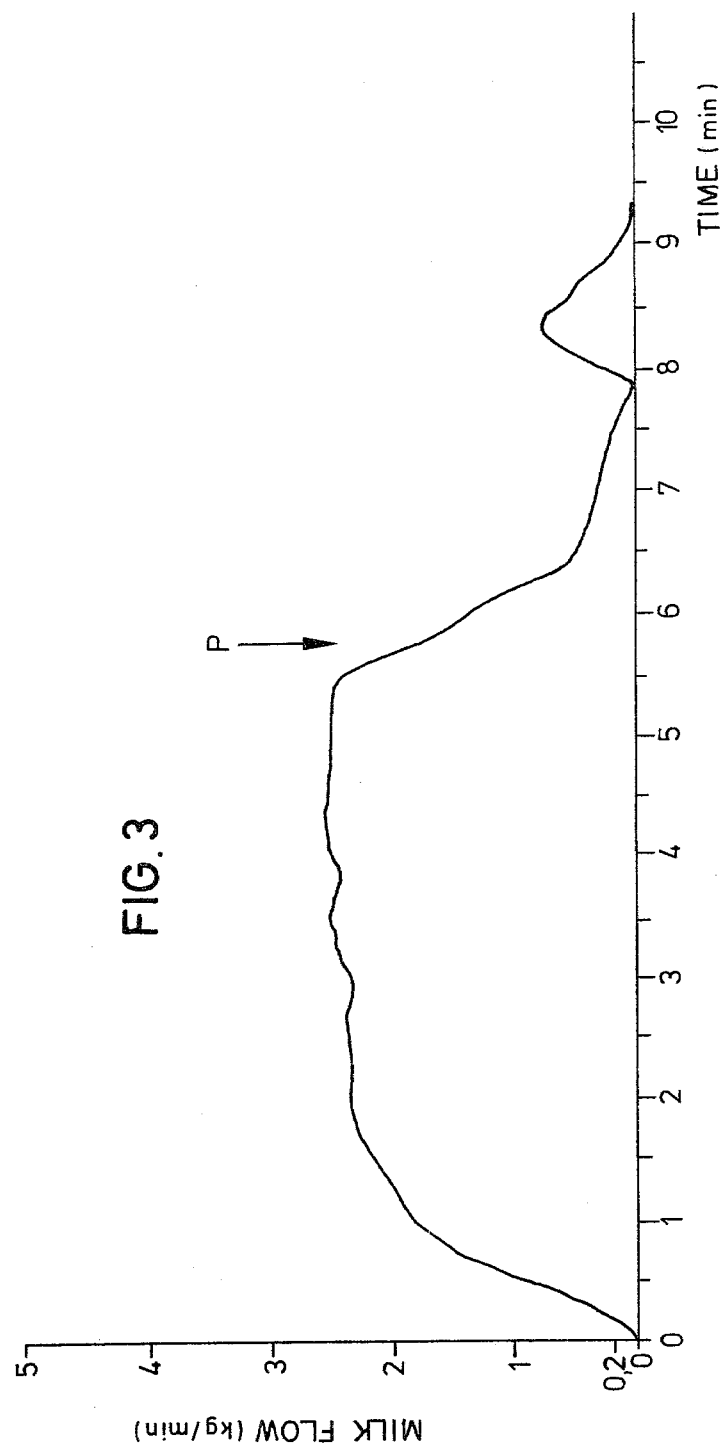
Figure 4:
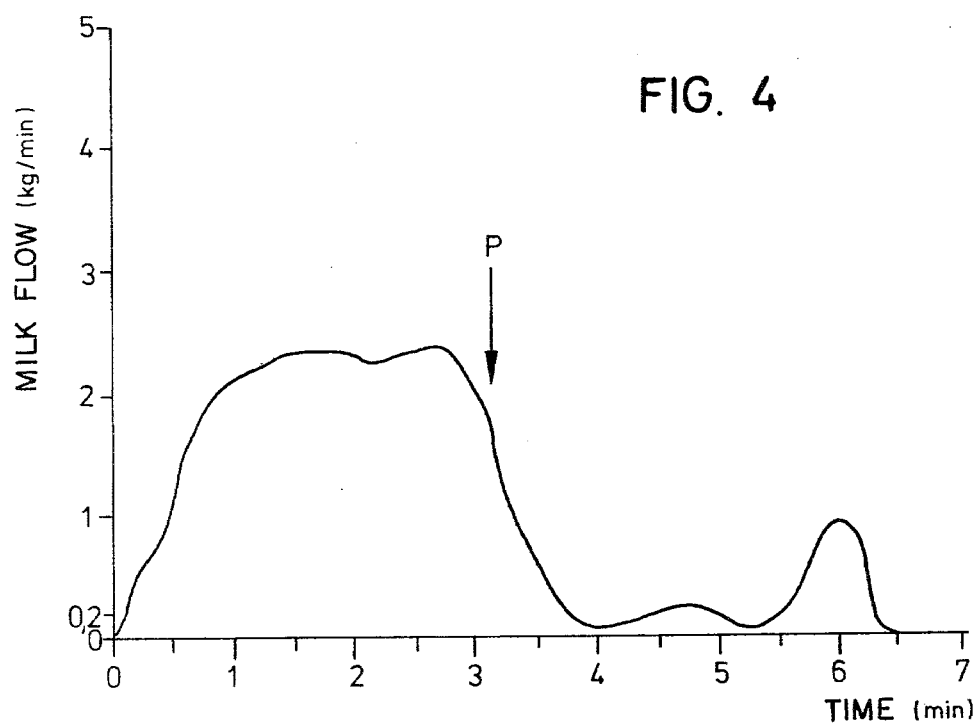

FIG. 1 illustrates with a diagram the milk flow rate in kg/min. in relationship to the time in minutes, as it occurs in most cases. At the start of the milking operation, the milk flow rate increases during approximately the first half minute to a maximum value. The milk flow rate remains at this maximum value for approximately two minutes after which a reduction of the milk flow rate occurs. The milk flow rate drops so much that after approximately three and one-half minutes it falls below a lower limit of 0.2 kg/min. As long as the milk flow rate, with the milking vacuum applied, remains below 0.2 kg/min., one speaks of a blind milking. Through a sufficient pull on the milking cup or through a manual after-milking, it is then finally possible to milk the finish milk, which is indicated by the rise of the curve in the time of between five and seven minutes.

The illustrations a to d above the diagram in FIG. 1 show the respective conditions of the teat in a common milking cup, during four different main stages of the milking operation. Illustration a shows the lower end of the udder 1 and the teat 2 connected thereto, at the lower end of which the milk exits at the streak canal 3. Illustration a shows the teat during the interval wherein the highest milk flow rate exists. During this time interval, the gland cistern 7 of the udder is directly connected to the teat cistern 8, which are both filled with milk. The full teat 2 rests against the suction nozzle 4 of a teat rubber. The upper edge portion of the enlarged head 5 of the teat rubber is spaced from the lower end of the udder. An atmospheric pressure or at most a small underpressure exists in the inner chamber 6 of the head 5 of the teat rubber.

Illustration b shows the condition during a reduction in the milk flow rate. The annular fold 9 (Fuerstenberg'sche Venenring) narrows down in this condition, so that the amount of milk which flows from the gland cistern into the teat cistern is less than the amount of milk, which is sucked out from the teat cistern through the streak canal. This relaxes the teat. Thus the seal between the shank of the teat rubber and the teat is no longer complete, so that the underpressure below the teat can move increasingly into the inner chamber 6 of the head 5 of the teat rubber below the upper edge portion thereof. In this condition, the actual sealing function passes from the teat rubber shank over to the upper sealing lip portion of the teat rubber. The inner chamber 6 of the head 5 is formed by the space, which is limited by the stronger enlarging upper end of the shank, the ring lip and the part of the teat, which part is not supported by the shank. Simultaneously with the relaxing of the teat, the friction between the teat rubber and the teat is increasingly reduced to the point, at which the remaining friction can no longer prevent a climbing up of the teat rubber on the teat. At this point in time, a climbing up of the teat rubber on the teat occurs within a few pulsation cycles.

Illustration c shows the condition, in which the milk flow rate has been reduced below 0.2 kg/min. and the teat is totally relaxed. The milking cup has totally climbed up the teat, so that its enlarged head 5 presses against the lower end of the udder and thereby particularly on the annular fold. Even though milk still exists in the gland cistern, same is not sucked off in spite of the relatively high milking vacuum.

Illustration d shows that the milk which still exists in the teat cistern is subsequently milked by applying a downward pull on the milking cup so that climbing up of the milking cup on the teat is again reversed.

This operation illustrates the finish milking procedure which has been commonly performed so far. It was necessary in order to accomplish this that either the milking person manually applied a suitable pull on the milking tool during the entire finish milking stage or that a corresponding device was provided, with the help of which such a pulling force could be applied onto the milking cup during the finish milking stage.

As has been discussed above, it has been discovered that the main reason why the cow's udder blocks at the end of the milking operation a further milk discharge is the fact that during the milking operation, the milking cup wanders or climbs upward on the teat. FIGS. 2 to 5 illustrate experiments, at which the starting point of climbing up of the milking cup on a teat was determined. The starting point of such a climbing up is shown in FIGS. 2 to 5 each by an arrow and the marking P. As shown by the drawings, such climbing occurs during many various times starting with the beginning of the milking operation. Thus according to FIG. 2, a climbing up occurs already after 2.3 minutes, in the curve according to FIG. 4 only approximately after 3.2 minutes, while in the case of the curves according to FIGS. 3 and 5, a climbing starts only at or after approximately 5.9 or 6.7 minutes. In addition, the curves show that the starting point of the climbing of the milking cup up the teat is obviously also independent of the level of the milk flow rate. Thus according to FIG. 2, climbing occurs already during a milk flow rate of approximately 2.5 kg/min, while in the case of the curve according to FIG. 5, a climbing starts not before a milk flow rate of a little above 0.2 kg/min. Based on these different values for various cows, a control dependent on the time or the milk flow rate are not suitable, particularly wherein one starts from a desire to attain, for the initial main milk flow rate, optimum milking parameters, using in particular a sufficiently high milking vacuum, in order to prevent an elongation of the milking time toward physiologically unfavorable long periods of time.

Figure 5:
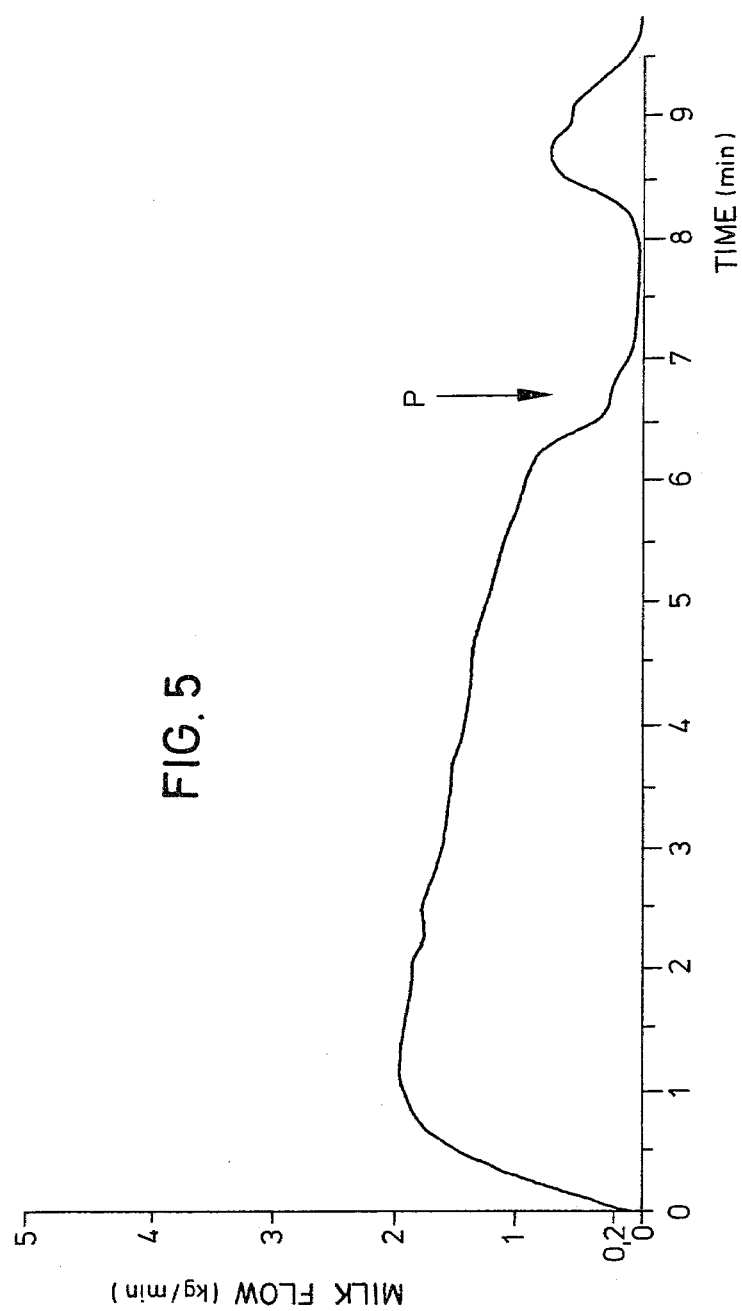

It has now been discovered that even if at the start of the milking operation a relatively high milking vacuum is applied to assure an as much as possible quick removal of milk, a slipping or climbing up of the milking cup on the teat can be prevented, if the change of the milk flow rate is continuously measured and if a reduction in the milking intensity is performed through a suitable change of the milking parameter when during a time interval of between approximately five and ten seconds a reduction of the milk flow of more than 1 kg/min.$^2$ is determined. As one can take from the curves of FIGS. 2 to 5, in which the entire milk flow rate from all four teats is illustrated, there results after a time period of the highest milk flow rate a relatively sharp decline of the milk flow rate during the transition toward the area of a reduced milk flow. This decline is yet substantially more distinct, if only the milk flow rate of one single teat is observed. Such a decline or a relatively large reduction of the milk flow rate occurs in FIG. 2 approximately at 2 min., in FIG. 3 at approximately 5.5 min., in FIG. 4 at approximately 7.8 min., and in FIG. 5 at approximately 6.2 min. Notice must be taken here that the milk flow rate can also vary already during the highest milk flow rate interval or it can even be gradually reduced altogether, as shown in FIG. 5 during the time of the highest milk flow rate interval. Thus the milk flow rate is reduced in the example illustrated in FIG. 5 during the highest milk flow rate interval approximately from 2.0 to 0.8 kg/min. Also in the example of FIG. 5, we deal with a cow which is difficult to milk, it is thus possible, with a change of the milking parameters, such as a reduction of the milking underpressure dependent on the change in the milk flow rate, to apply for an extremely long time interval of six minutes, namely during the time of the highest milk discharge rate, an as high as possible vacuum, which is particularly absolutely necessary in the case of cows which are difficult to milk, if a milk discharge is to take place at all and the milking time is not to be extended to physiologically unfavorable long periods of milking time. A climbing of the milking cup occurs also in this case only at the end of the main milking stage after the occurrence of a sudden milk flow rate change, at approximately 6.2 min.

The reduction of the milking intensity through a change of the milking parameters must be carried out within a relatively short period of time, namely in every case during a shorter time period than 20 to 30 sec., after the start of the milk flow rate changes at a rate above a value of 1 kg/min.$^2$, since otherwise during this time the milking cup has already moved up on the teat and cannot be moved back down the teat without a manual assistance. For this reason, the conventional devices, in which the level of the milking underpressure is controlled by and proportional to the milk flow, are not suited for preventing a climbing of the milking cup up the teat, since the control in these conventional devices is substantially too slow. To assure an as much as possible exact control, the milk flow change is preferably individually monitored at each teat and either a simultaneous change of the milking intensity at all four teats is controlled dependent on the first occurrence of a large reduction of the milk flow, or the milking intensity is controlled individually at all four teats. If a control takes place based on the entire milk flow in all four teats, then a possibility should be noted that the front quarters of an udder usually produce only approximately 45% of the entire supply of milk and the hind quarters approximately 55% of the entire supply of milk. The thus effected difference in the milking time is compensated for only partly in that the front quarters milk slightly slower than the hind quarters. However, in order to achieve as much as possible the simultaneous termination of the main milk flow both in the front quarters and in the rear quarters, the milking parameters for these quarters can be adjusted to one another already at the start of the milking operation so that this will be the case. This can be achieved by the suction-stage time intervals being chosen different for the front and hind quarters.

The change of the milking intensity after the normal milking stage, thus the stage of the highest milk flow rate, can take place in various ways, as will be discussed below. In every case the milking intensity should be reduced after determining the above-described change in the milk flow rate at least one time, possibly also several times, so that at most as much milk is removed through the streak canal from the teat cistern as can flow thereafter through the annular fold from the gland cistern. In this manner, the milking underpressure is prevented from transferring into the teat cistern, which causes the teat to relax and the milking cup to possibly climb up on the teat. A repeated reduction of the milking intensity can then be indicated when approximately a time period after a first reduction of the milking intensity the condition again occurs that the milking cup threatens to climb. If a repeated reduction of the milking intensity is carried out, each change from a higher milking intensity to a lower milking intensity occurs also dependent on the change of the milk flow rate, namely as soon as a change of more than 1 kg/min.$^2$ is determined.

A first possibility to reduce the milking intensity consists in reducing the milking underpressure. However, it must be noted that such a reduction of the milking underpressure can react too slowly at otherwise equal milking parameters, if a control valve is not provided directly in the milk-conducting line near the milking cup. A change of the milking underpressure can be achieved, as it is already known, by providing two separate vacuum lines with different underpressures.

A further possibility for reducing the milking intensity consists in the relationship of the suction stage and the relief stage being changed such that the suction stage is reduced with respect to the relief stage. Examples are also already known for such a control.

A particularly preferable and simply reached reduction of the milking intensity is achieved by the pulsator underpressure being reduced. As a result, it is achieved that the teat rubber no longer fully opens the streak canal in the suction stage, so that less milk can flow out of the teat during a suction stage.

A further possibility for reducing the milking intensity consists in an increase of the pulsating frequency. Such a frequency change can be technically carried out relatively simply. As a result, a shortening of the relative suction stage is effected in the pulsators common today, because the teat rubber no longer opens up fully in the suction stage at higher frequencies, but vibrates at a more or less collapsed condition, which is the case approximately at frequencies of 100 pulsations/min.

The actual reduction of the milking intensity depends, however, in this case on the type of the pulsator, the volume of the pulsation chambers and also from the return force of the teat rubber. As a whole, a good teat massage and a slow finish milking is achieved in the case of such a procedure. In addition, injury due to a blind milking does not occur. Furthermore, it was discovered that in the case of such a method of milking, an optimum stimulation of the cow takes place, so that this method could also be applied at the start of the milking process in the stimulation stage. Apparatus to increase the pulsation frequency are also already known. During the use of this possibility, an additional noise dampening means should, if desired, be provided.

Apparatus for measuring the milk flow rate are also sufficiently known in the technique. The measurement of the change of the milk flow rate can take place for example by electronic measurement, wherein for example by the milk flow rate of the respectively last 2 to 10 pulsation cycles can be averaged in order to exclude smaller, short-period variations. This can be accomplished approximately by a continuous storage of the measured values in a storage and calculating the medium value, or a method can also be applied, in which each measuring signal is fed through a low-pass filter.

Since with the inventive method a continuous finish milking without leaving any residual milk is achieved, the inventive method is particularly suited for use in devices for achieving an automatic removal of the milking cup. Such a removal of the milking cup can be controlled for example in a simple manner by producing an additional signal, if a smaller milk flow rate than 0.2 kg/min. is determined. In this case, the milking process is particularly teat-protecting, since an automatic switching off occurs prior to the start of a blind milking.

Only in the case of cows which are particularly difficult to milk may the situation occur, that the milk flow rate is constantly reduced, so that no noticeable reduction of the milk flow rate occurs to initiate a reduction of the milking intensity. To avoid in these cases injury due to blind milking, a device should be provided in a preferable manner, from which, when the milk flow rate falls below a predetermined value of for example 0.4 or 0.2 kg/min. a signal is emitted, which indicates to the milker that in the case of this cow a complete finish milking did not take place, and which at the same time prevents the removal of the milking cup.

The embodiments of the invention in which an exclusive property or privilege is claimed are defined as follows:

1. In a method for the automatic finish milking during a mechanical milk removal procedure, in which the teat which is introduced into an elastic teat rubber of the milking cup is exposed to a predetermined underpressure, a pulsating underpressure is applied to a space between a milking cup housing and the teat rubber which encloses the teat, a continuous milk flow measurement is carried out and the milking intensity is reduced dependent on the result of the measurement, the improvement comprising wherein the continuous measurement detects the change of the milk flow per unit of time and the reduction of the milking intensity occurs directly after a reduction of the milk flow rate of more than 1 kg/min$^2$, which reduction was determined during a period of time of five to ten seconds.

2. In a method for the automatic finish milking during the mechanical milk removal procedure, in which the teat which is introduced into an elastic teat rubber of the milking cup is exposed to a predetermined underpressure and a pulsating underpressure is applied to a space between a milking cup housing and the teat rubber enclosing the teat, the measurement of a milking parameter is continuously carried out and the milking intensity is reduced dependent on the result of the measurement, the improvement comprising wherein the continuous measurement procedure detects the pressure inside of the head of the teat rubber below the ring lip which rests against the teat and wherein the the milking intensity is abruptly reduced at the start of a drop of said pressure.

3. The method according to claim 1 or 2, wherein the milking intensity is reduced by the underpressure being reduced on the teat.

4. The method according to claim 1 or 2, wherein the milking intensity is reduced by the pulsator frequency of the underpressure being increased in the space between the milking cup housing and the teat rubber.

5. The method according to claim 1 or 2, wherein the milking intensity is reduced by the pulsator stage relationship between the suction stage and the relief stage being reduced.

6. The method according to claim 1 or 2, wherein the milking intensity is reduced by the pulsation underpressure being reduced in the space.

7. The method according to claim 1 or 2, wherein if a reduction of the milking intensity does not take place during a time period of 6 to 8 min. after the start of the milking operation or after falling below a milk flow rate of 0.2 kg/min, a signal is produced.

* * * * *